United States Patent [19]

Chen et al.

[11] 4,046,522
[45] Sept. 6, 1977

[54] PRE-ENGINE CONVERTER FOR USE WITH FUELS CONTAINING OXYGENATED COMPOUNDS

[75] Inventors: Nai Yuen Chen, Titusville; Heinz Heinemann, Princeton, both of N.J.

[73] Assignee: Mobil Oil Corporation, New York, N.Y.

[21] Appl. No.: 699,811

[22] Filed: June 25, 1976

[51] Int. Cl.² ............................................. C10G 13/02
[52] U.S. Cl. ........................ 48/102 A; 48/107; 48/120; 48/197 R; 48/213; 123/3; 252/373; 423/328
[58] Field of Search ............ 48/107, 102 A, 105, 48/95, 120, 211, 212, 213, 215, 214 A, 197 R; 252/373; 423/328; 123/2, 3, 25 R; 208/111

[56] References Cited

U.S. PATENT DOCUMENTS

| | | | |
|---|---|---|---|
| 2,692,193 | 10/1954 | Riesz et al. | 48/214 A |
| 3,758,403 | 9/1973 | Rosinski et al. | 208/111 |
| 3,855,980 | 12/1974 | Weisz et al. | 123/3 |
| 3,983,029 | 9/1976 | White | 208/111 |

*Primary Examiner*—Robert L. Lindsay, Jr.
*Assistant Examiner*—George C. Yeung
*Attorney, Agent, or Firm*—Charles A. Huggett; Ronald J. Cier

[57] ABSTRACT

A pre-engine catalytic converter for use with fuels which are mixtures of hydrocarbons and oxygenated organic compounds, such as alcohols, ethers and ketones, convertible to carbon monoxide and $H_2$. The converter comprises two catalyst beds arranged in series, the first containing a catalyst suitable for the decomposition of organic oxygenates to CO and $H_2$ and the second containing a cracking catalyst of the ZSM-5 zeolite type to convert the liquid hydrocarbon fuel to gaseous hydrocarbon fuel. Energy is extracted from the engine exhaust by heat exchange and utilized to support the catalytic reactions whereby the heating value and the octane rating of the fuel are increased. The performance and fuel economy of the engine are substantially improved.

9 Claims, 2 Drawing Figures

PRE-ENGINE CONVERTER FOR USE WITH FUELS CONTAINING OXYGENATED COMPOUNDS

BACKGROUND OF THE INVENTION

1. Field of the Invention

This invention is concerned with pre-engine catalytic converters for use with fuel systems containing some oxygenated organic compounds mixed with liquid hydrocarbon fuel. In particular it is concerned with increasing the octane number and the heating value of the fuel so as to improve both the performance and the fuel economy of the system.

2. Description of the Prior Art

The blending of alcohols, ethers, esters and the like with hydrocarbon fuels for the purpose of increasing the octane number of said fuel is well known in the art. For instance, U.S. Pat. No. 3,904,384 discloses a high octane gasoline produced by mixing suitable hydrocarbons with t-butyl isopropyl ethers; U.S. Pat. No. 3,903,251 mixes butyl alcohol and butyl acetate with hydrocarbons; and U.S. Pat. No. 3,901.,664 blends t-butyl alcohol, isopropyl alcohol and methyl alcohol with hydrocarbons to produce high octane motor fuel. These fuels typically contain as much as 40% of oxygenated compounds in the blend to increase to octane number of the gasoline to a level competitive with that of gasoline containing tetraethyl lead, an octane booster in commercial fuels. However, although many oxygenated organic compounds have high octane ratings and are able to impart increased anti-knock properties to hydrocarbon motor fuels and some of them, such as methanol, have been proposed for use as fuels by themselves, they have very poor fuel economy characteristics relative to petroleum gasolines. By using a pre-engine converter system as embodied herein the advantages derivable from oxygenates can be realized without sacrificing fuel economy.

An additional advantage of the system of this invention is that it overcomes the cold-start problems encountered with pre-engine catalytic converters which are designed to crack low octane normally liquid hydrocarbons to light, normally gaseous, higher octane hydrocarbon fuel. The primary problem is that when one is first starting an engine, in an automobile for instance, there is not sufficient heat available to bring the cracking catalyst up to the temperature required to induce the desired reaction. In addition, the cracking reaction is endothermic. The result, of course, is that the gasoline that reaches the engine is just as low in octane number as it was before entering the pre-engine converter and engine performance is very poor unitl it warms up enough to heat the catalyst to cracking temperature. Very elaborate procedures have been proposed to overcome the problem, including the use of two separate fuel systems, electric warm-up of the catalyst utilizing the energy stored in the car battery and pre-combustion of a portion of the fuel within the catalytic converter, but they all have features which make them undesirable or impractical.

SUMMARY OF THE INVENTION

An object of this invention is to provide a pre-engine catalyst converter system which will convert low octane, normally liquid hydrocarbon fuel to higher octane, normally gaseous hydrocarbon fuel.

A further object of this invention is to provide a pre-engine catalytic converter which will decompose high octane oxygen-containing organic compounds to CO and $H_2$ to increase their heating value and thereby improve fuel economy.

A still further object of this invention is to provide a fuel system, for use with the above pre-engine catalytic converter system, comprising a low octane, normally liquid hydrocarbon fuel blended with high octane oxygen-containing organic compounds such as low molecular weight alcohols, ethers and ketones, said blended fuel being of sufficient quality to operate the engine without the pre-engine converter until said engine has warmed up and in turn has heated the catalytic converter to operating temperature.

Objects and advantages other than those mentioned above will become apparent from the entire disclosure including the claims herein.

In general, the present invention relates to a catalytic converter adapted for installation in the fuel line of an engine, between the fuel reservoir and the engine itself, replacing the conventional carburetor. The converter is comprised of two separate reactors, each containing a bed of catalytic material, connected in series, i.e., they are arranged in such a way that the fuel passes through first one and then the other of the reactors thereby coming in contact with the first one and then the other bed of catalytic material. The catalytic material contained in the first reactor, and which therefore first comes into contact with the fuel, is of a type suitable to decompose oxygen-containing organic compounds (e.g., having a octane number of at least 100) to CO and $H_2$, said type comprising, but mot limited to, alumina, zinc chromite, copperzinc chromite, manganese chromite, supported iron and cobalt, etc. The second reactor contains a hydrocarbom cracking catalyst, the purpose of which is to convert a low octane normally liquid hydrocarbon fuel to a higher octane normally gaseous hydrocarbon fuel, said cracking catalyst comprising a special class of zeolite catalysts of the ZSM-5 type.

The fuel used in the present invention is a blend of a relatively low octane number normally liquid hydrocarbon fuel and low molecular weight oxygen-containing organic compounds. Said blend may be in any relatively deemed suitable for the particular application in which this invention is utilized but, in general, the oxygen-containing compound or compounds comprise at least, and preferably, more than 2% by volume of the fuel mixture.

BRIEF DESCRIPTION OF THE DRAWINGS

Understanding of our invention will be facilitated by reference to the attached drawings wherein.

DESCRIPTION OF PREFERRED EMBODIMENTS

Figure 1:
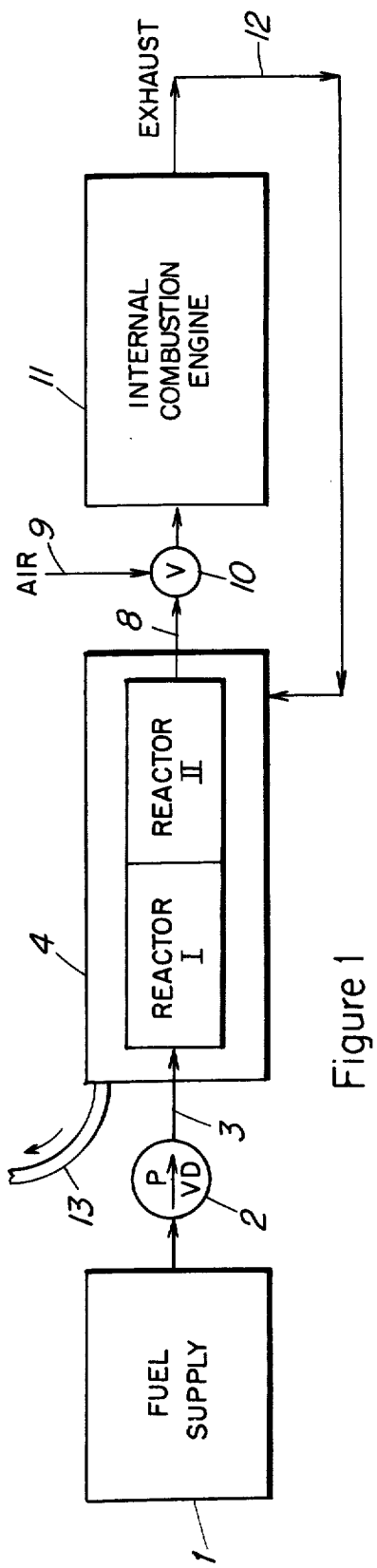
FIG. 1 is a schematic representation of said invention used in conjunction with an internal combustion engine and FIG. 2 is a detailed section of the catalytic converter showing the dual reactors.

Referring to FIG. 1, a fuel comprising a blend of normally liquid hydrocarbons having a low octane number in mixture with low molecular weight oxygen-containing organic compounds is fed from Fuel Supply 1 by means of Fuel Pump 2 through Fuel Line 3 and into Catalytic Converter 4. Upon entering the first chamber (Reactor I) the fuel contacts a bed of particulate solid catalytic material suitable for the decomposition of oxygencontaining organic compounds to CO and $H_2$. The effluent fuel from the first chamber (Reactor I), i.e., a mixture of CO; $H_2$ and low octane number hydrocarbons, by virtue of the oxygen-containing organic compounds having been substantially decomposed in, is passed to the second chamber (Reactor II) where it is contacted with a bed of the ZSM-5 type cracking catalyst in particulate form. The low octane normally liquid hydrocarbons are converted in Reactor II to higher octane gaseous hydrocarbons and the effluent from Reactor II, i.e. a gaseous fuel mixture comprising CO, $H_2$ and higher octane hydrocarbons, passes out of the pre-engine converter into Fuel Line 8.

The proper amount of air is then introduced into the fuel stream from Air Feed Line 9 via Mixing Valve 10 and the resulting air-enriched fuel is introduced into Internal Combustion Engine 11 where it is burned and converted to mechanical energy. The hot exhaust gas leaving the engine by Exhaust Line 12 is circulated through Catalytic Converter 4 where by indirect heat exchange it gives up a portion of its heat to Reactors I and II and thereby provides heat in support of the aforementioned catalytic reactions. The cooled exhaust gases then leave Catalytic Converter 4 through Exhaust Port 13 and are vented in the usual manner.

Figure 2:
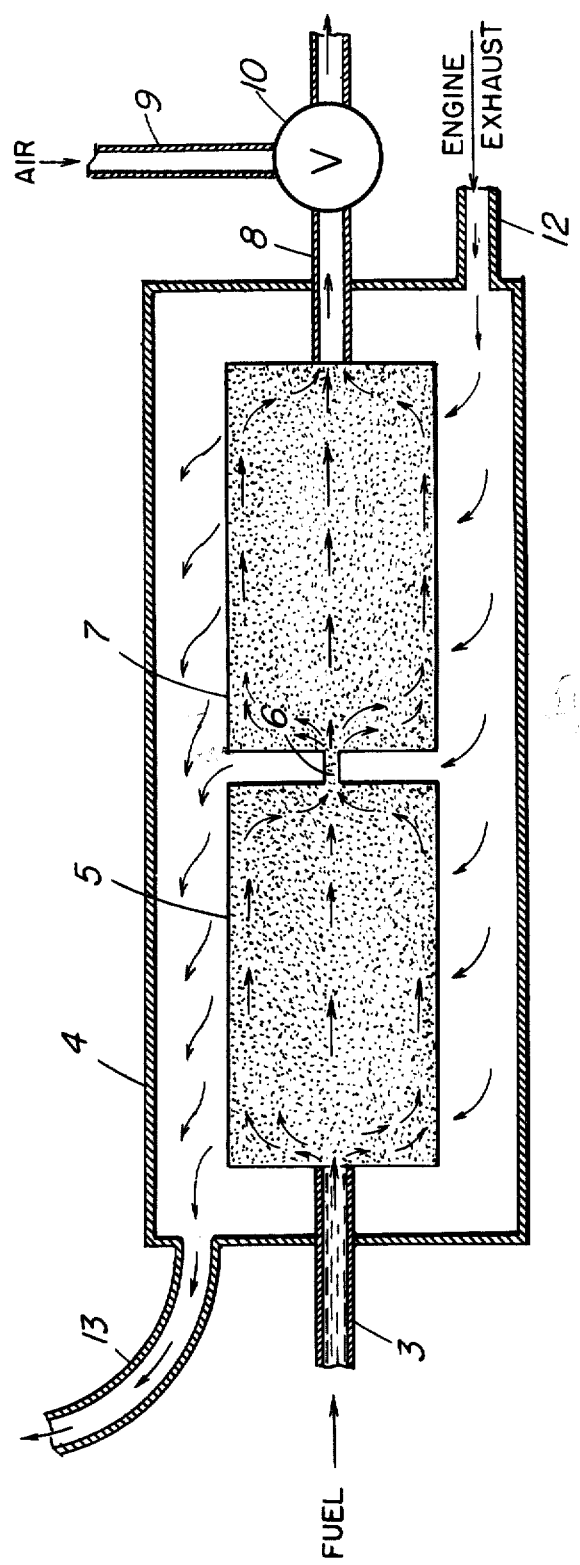

FIG. 2 shows in more detail an apparatus embodied for use in the practice of this invention. The crude fuel mixture of oxygenated compounds and liquid hydrocarbons enters the system at Fuel Inlet Conduit 3 where it mixes with the decomposition Catalyst 5 in the first reactor. The effluent therefrom then pases through Coupling 6, which may be pipe, a perforated plate or any other appropriate means to connect the two reactors and still allow the fuel to pass from the first reactor into the second reactor for contact with the Cracking Catalyst 7. The resulting fuel then leaves the pre-engine converter, is mixed with air introduced via Air Feed 9, and fed into an internal combustion engine as aforementioned.

The crude fuel used in this system is a blend of low octane hydrocarbon gasoline with oxygenated organic compounds. Oxygenates, such as low molecular weight alcohols, ethers and ketones, have high octane numbers. Blended in amounts greater than 2% by volume with hydrocarbons they can provide an octane boost such that the use of tetraethyl lead can be eliminated or substantially minimized. However, because of their low heating value, their fuel economy, as measured in miles per gallon is significantly lower then that of petroleum gasolines. Fortunately it has been found that when the oxygenates are decomposed to CO and $H_2$, the heating value of the fuel can be increased significantly. On a per gallon basis, the heating value of the oxygenates can be raised to a level comparable to that of the petroleum gasoline as can be seen in the following table wherein the improved fuel economy is shown for a few typical examples.

In addition, both CO and $H_2$ are excellent high ocatane fuels. Thus by using a pre-engine converter as embodied herein to decompose the oxygenates to CO and $H_2$ the octane boosting qualities of these compounds can be realized without substantially sacrificing fuel economy.

|  | Heating Values | | | |
|---|---|---|---|---|
|  | Liquid Fuel | | After Converting to CO + $H_2$ BTU/gal | % Increase in Fuel Economy |
|  | BTU/lb | BTU/gal | | |
| Methanol | 9,800 | 64,500 | 75,600 | 17 |
| Ethanol | 12,800 | 84,200 | 105,100 | 25 |
| Acetone | 13,300 | 87,500 | 111,000 | 27 |
| Ether | 15,900 | 94,000 | 117,400 | 25 |
| Petroleum Fuels | 20,000 | 120,000 | — | — |

Using a mixture of oxygenates and petroleum gasoline eliminates the cold-start problem because the mixture can be formulated to provide sufficient quality to operate the engine without the pre-engine converter. Aftr the engine has warmed up the catalysts begin to function to convert the liquid fuel to CO, $H_2$ and petroleum gases to improve fuel economy. The reactions involved are highly endothermic and the heat required is derived from the exhaust gas.

Complete conversion of oxygenates to CO and H requires the addition of water, except in the case of methanol. Such water may be supplied, in the system embodied herein, by the partial dehydration of oxygenates or by the addition of water to the fuel, for example, in the form of encapsulated droplets, as an emulsion, etc. The amount of water needed for the complete conversion of the oxygenates to CO and $H_2$ can be derived from the following equation:

$$C_aH_bO + (a - 1) H_2O \longrightarrow aCO + \left[\left(\frac{2a + b}{2}\right) - 1\right]H_2$$

where $a \geqq 2, b \geqq 6$

For example, in the case of use of ethanol as the oxygenated compound in the fuel blend, as much as 0.3 gallons of water per gallon of ethanol could be added to the fuel. When less water is added correspondingly less improvement in fuel economy can be expected.

The aforesaid improvement in fuel economy takes into consideration only the increased heating value of the fuel with the pre-engine converter. In practice even better fuel economy can be expected. This is because of the better burning characteristics of the gaseous fuel after it leaves the pre-engine converter and enters the engine. As as result the engine may be designed to operate more efficiently as, for example, at a higher compression ratio and with less fuel-to-air ratio.

A substantial requirement of the novel operation of a pre-engine converter according to this invention is the use of a cracking catalyst comprising a special zeolite. Members of this special class of zeolites exhibit some unusual properties. These zeolites induce profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents, i.e. high silica to alumina ratios, they are very active even with silica to alumina ratios exceeding 30. This activity is surprising since catalytic activity of zeolites generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g. of the X and A type. Furthermore, carbonaceous deposits, when formed, may be removed by burning at higher than usual temperatures to restore activity. In many environments the zeolites of this class exhibit very low coke forming capability, conducive to very long times on stream between burning regenerations.

An important characteristic of the crystal structure of this class of zeolites is that it provides constrained access to, and egress from, the intra-crystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolites useful in type B catalysts in this invention possess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e., they exhibit "hydrophobic" properties. It is believed that this hydrophobic character is advantageous in the present invention.

The zeolites useful as catalysts in this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings of oxygen atoms, then access by molecules of larger crosssection than normal hexane is substantially excluded and the zeolite is not of the desired type. Zeolites with windows of 10-membered rings are preferred, although excessive puckering or pore blockage may render these zeolites substantially ineffective. Zeolites with windows of twelve-membered rings do not generally appear to offer sufficient constraint to produce the advantageous conversions desired in the instant invention, although structures can be conceived, due to pore blockage or other cause, that may be operative.

Rather than attempt to judge from crystal structure whether or not a zeolite possesses the necessary constrained access, a simple determination of the "constraint index" may be made by continuously passing a mixture of equal weight of normal hexane and 3-methylpentane over a small sample, approximately 1 grams or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F for at least 15 minutes. The zeolite is then flushed with helium and the temperature adjusted between 550° F and 950° F to give an overall conversion between 10% and 60%. The mixture of hydrocarbons is passed at 1 liquid hourly spaced velocity (i.e., 1 volume of liquid hydrocarbon per volume of catalyst per hour) over the zeolite with a helium dilution to give a helium to total hydrocarbon mole ratio of 4:1. After 20 minutes on stream a sample of the effluent is taken and analyzed, most conveniently by gas chromatography, to determine the fraction remaining unchanged for each of the hydrocarbons.

The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Catalysts suitable for the present invention are those which employ a zeolite having a constraint index from 1.0 to 12.0. Constraint Index (CI) values for some typical zeolites including some not within the scope of this invention are:

| CAS | CI |
|---|---|
| ZSM-5 | 8.3 |
| ZSM-11 | 8.7 |
| TMA Offretite | 3.7 |
| ZSM-12 | 2 |
| Beta | 0.6 |
| ZSM-4 | 0.5 |
| H-Zeolon | 0.5 |
| REY | 0.4 |
| Amorphous Silica-alumina | 0.6 |
| Erionite | 38 |

The above-described Constraint Index is an important, and even critical, definition of those zeolites which are useful to catalyze the instant process. The very nature of this parameter and the recited technique by which it is determined, however, admit of the possibility that a given zeolite can be tested under somewhat different conditions and thereby have different constraint indexes. Constraint Index seems to vary somewhat with severity of operation (conversion). Therefore, it will be appreciated that it may be possible to so select test conditions to establish multiple constraint indexes for a particular given zeolite which may be both inside and outside the above defined range of 1 to 12.

Thus, it should be understood that the parameter and property "Constraint Index" as such value is used herein is an inclusive rather than an exclusive value. That is, a zeolite when tested by any combination of conditions within the testing definition set forth hereinabove to have a constraint index of 1 to 12 is intended to be included in the instant catalyst definition regardless that the same identical zeolite tested under other defined conditions may give a constraint index value outside of 1 to 12.

The class of zeolites defined herein is exemplified by ZSM-5, ZSM-11, ZSM-12, ZMS-21, and other similar materials. U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

U.S. application, Ser. No. 358,192, filed May 7, 1973, now abandoned, the entire contents of which are incorporated herein by reference, describes a zeolite composition, and a method of making such, designated as ZSM-21 which is useful in this invention. Recent evidence has been adduced which suggests that this composition may be composed of at least two (2) different zeolites, one or both of which are the effective material insofar as the catalysis of this invention is concerned. Either or all of these zeolites is considered to be within the scope of this invention.

The specific zeolites described, when prepared in the presence of organic cations, are substantially catalytically inactive, possibly because the intracrystalline free space is occupied by organic cations from the forming solution. They may be activated by heating in an inert atmosphere at 1000° F for one hour, for example, followed by base exchange with ammonium salts followed by calcination at 1000° F in air. The presence of organic cations in the forming solution may not be absolutely essential to the formation of this special type zeolite; however, the presence of these cations does appear to favor the formation of this special type of zeolite. More generally, it is desirable to activate this type zeolite by base exchange with ammonium salts followed by calcination in air at about 1000° F for from about 15 minutes to about 24 hours.

Natural zeolites may sometimes be converted to this type zeolite by various activation procedures and other treatments such as base exchange, steaming, alumina extraction and calcination, alone or in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12, and ZSM-21, with ZSM-5 particularly preferred.

The zeolites used as catalysts in this invention may be in the hydrogen form or they may be base exchanged or impregnated to contain ammonium or a metal cation complement. It is desirable to calcine the zeolite after base exchange. The metal cations that may be present include any of the cations of the metals of Groups I through VIII of the periodic table. However, in the case of Group IA metals, the cation content should in no case be so large as to substantially eliminate the activity of the zeolite for the catalysis being employed in the instant invention. For example, a completely sodium exchanged H-ZSM-5 appears to be largely inactive for shape selective conversions required in the present invention.

In a preferred aspect of this invention, the zeolites useful as catalysts herein are selected as those having a crystal framework density, in the dry hydrogen form, of not substantially below about 1.6 grams per cubic centimeter. It has been found that zeolites which satisfy all three of these criteria are most desired. Therefore, the preferred catalysts of this invention are those comprising zeolites having a constraint index as defined above of about 1 to 12, a silica to alumina ratio of at least about 12 and a dried crystal density of not substantially less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier This paper, the entire contents of which are incorporated herein by reference, is included in "Proceedings of the Conference on Molecular Sieves, London, April, 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, seems to be important as the locus of catalytic activity.

Crystal framework densities of some typical zeolites including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

An example of the manner in which the method of the present invention may be carried out utilizing apparatus as shown in the drawings hereof, is as follows: Fuel for an automobile engine is blended to a Research Octane Number of 96.8 by mixing 30 volumes of methanol with 70 volumes of a low octane gasoline (80 R +0). The heating value of this blended fuel is 103 MBtu/gal., which is 15% lower than a conventional petroleum gasoline of the same octane rating. The blended fuel is placed in the fuel tank of the automobile and the engine started in the normal manner. The fuel is passed through Fuel Line 3 into the first reactor and through the second reactor of Catalytic Converter 4, chemically unaffected by the cold Catalyst Beds 5 and 7, and then into Fuel Line 8 where it is mixed with air introduced via Line 9 at Mixing Valve 10 and thence into the engine where it is burned and the heat generated thereby converted to mechanical energy. The blended fuel is of sufficient quality of operate the automobile in a satisfactory manner until the engine warms up and in turn heats the catalytic converter by indirect heat exchange to operating temperature.

As the hot exhaust gases are expled from the engine through Exhaust Line 12 they are channeled to and through the Catalytic Converter 4, where they cause the temperature of Reactors I and II to increase by way of heat exchange, and leave the catalytic converter by means of Exahust Port 13 and into the normal automobile exhaust means. The catalytic reactions commence as the reactors are heated to about 600° F, with both catalysts reaching their peak efficiency at above 750° F.

The blended fuel, which passes through the catalytic converter means at the rate of 1-200 liquid volumes of fuel per volume of catalyst per hour (LHSV) depending on the demand of the automobile engine, comes first into contact with the catalyst (e.g., zinc chromite) contained in Catalyst Bed 5, said catalyst interacting with and converting the methanol component of said fuel to $CO$ and $H_2$. The resulting mixture of low octane gasoline, $CO$ and $H_2$ passes out of Reactor I, through Reactor Coupling 6, and into Reactor II where it comes into intimate contact with Catalyst Bed 7 (comprising ZSM-5 zeolite) and the low octane gasoline component of said fuel mixture is converted to gaseous hydrocarbons having a lower molecular weight and higher octane rating than the original gasoline components.

As the catalytic conversion increases, the heating value and the octane number of the fuel leaving the catalytic converter increase. At its peak efficiency, the resulting fuel comprises approximately 4.6 wt.% hydrogen, 27.4 wt.% carbon monoxide and 68 wt.% gaseous hydrocarbons. It has an octane rating greater than 100 R+0 and a heating value of 117 MBtu/gal. This gaseous fuel leaves Reactor II and Catalytic Converter 4 by means of Fuel Line 8. It is mixed with air introduced via Line 9 at Mixing Valve 10 and burned in an engine as aforementioned, the cycle continuing in this manner until the engine is turned off.

The increase in heating value comes partly in the form of chemical energy and partly in the vaporization and heating of the fuel. Thus, energy is extracted from the exhaust gas and converted into useful mechanical energy by this process. The result is improved fuel economy and a smoother and cleaner running engine.

What is claimed is:

1. A pre-engine converter comprising:
 a. two sequential reaction chambers;
 b. a catalytic material in the first of said chambers that is effective to catalytically decompose oxygen-containing organic compounds to carbon monoxide and hydrogen;
 c. a catalytic material in the second of said chambers that comprises a crystalline aluminosilicate zeolite having a silica to alumina ratio of at least 12, a constraint index of 1 to 12, and a crystal density of not substantially below about 1.6 grams per cubic centimeter and is effective for catalytically cracking low octane normally liquid hydrocarbons to higher octane normally gaseous hydrocarbons;
 d. means for introducing into said first chamber a liquid fuel comprising a low octane normally liquid hydrocarbon in mixture with one or more low molecular weight, high octane value, oxygen-containing organic compounds;
 e. means for passing the effluent from said first chamber into said second chamber;
 f. means for removing from said second chamber an effluent comprising carbon monoxide, hydrogen and higher octane normally gaseous hydrocarbons;
 g. means for mixing air with the gaseous effluent from said second chamber;
 h. means to introduce into an internal combustion engine the mixture of air and said gaseous effluent;
 i. means to pass the hot exhaust gases from said engine into indirect heat exchange relationship with said pre-engine converter;
 j. means enclosing said first and second reaction chambers and connected to said exhaust means whereby the heat from said hot exhaust gases emitting from said engine is transferred to said reaction chambers and the catalysts contained therein; and
 k. means for venting said exhaust gases from said heat transfer means.

2. The pre-engine converter of claim 1 wherein the catalyst in each of the two chambers is a solid, particulate material.

3. The pre-engine converter of claim 1 wherein the zeolite cracking catalyst is ZSM-5.

4. In the operation of an internal combustion engine, the process of converting in a pre-engine converter used in conjunction with such engine a liquid fuel feed mixture comprising low octane, normally liquid hydrocarbons and one or more low molecular weight, low heating value, oxygen-containing organic compounds, said mixture being suitable for intermittent cold operation of said engine, to a higher octane, higher heating value gaseous fuel comprising normally gaseous hydrocarbons, carbon monoxide and hydrogen, with process comprises:
 a. heating said pre-engine converter by passing the hot exhaust gases from said engine in indirect heat exchange relationship therewith;
 b. initially contacting said liquid fuel mixture with a catalytic material suitable for the decomposition of oxygen-containing organic compounds,
 c. which catalytic material decomposes the oxygen-containing organic compounds in the normally liquid fuel feed mixture to carbon monoxide and hydrogen;
 d. then contacting the effluent therefrom with a second catalyst comprising a crystalline aluminosilicate zeolite cracking catalyst having a silica to alumina ratio of at least 12, a constraint index of 1 to 12 and a crystal density of not substantially below about 1.6 grams per cubic centimeter;
 e. whereby the low octane normally liquid hydrocarbons of the feed mixture are converted to higher octane normally gaseous hydrocarbons and provide, as an effluent from said contact with said cracking catalyst, a fuel mixture comprising $CO$, $H_2$ and gaseous hydrocarbons having higher octane value and higher heating value than said liquid fuel feed mixture.

5. The process of claim 4 wherein said oxygen-containing organic compound is present in amounts greater than 2% by volume in said liquid fuel feed mixture.

6. The process of claim 4 wherein said oxygen-containing compound is methyl alcohol.

7. The process of claim 4 wherein water is added to said liquid fuel feed mixture in an amount according to the following equation:

where $C_aH_bO$ is the empirical formula for said oxygen-containing organic compound and $a \geq 2$ and $b \geq 6$.

8. The process of claim 4 wherein said catalytic material for the decomposition of oxygen-containing organic compounds is alumina, zinc chromite, copper zinc chromite, manganese chromite, iron or cobalt.

9. The process in claim 4 wherein said zeolite cracking catalyst is ZSM-5.

* * * * *